US012610946B2

(12) United States Patent
Beetge

(10) Patent No.: US 12,610,946 B2
(45) Date of Patent: Apr. 28, 2026

(54) FORMULATIONS FOR DECONTAMINATING A SURFACE

(71) Applicant: Jan Hendrik Beetge, Pearland, TX (US)

(72) Inventor: Jan Hendrik Beetge, Pearland, TX (US)

( * ) Notice: Subject to any disclaimer, the term of this patent is extended or adjusted under 35 U.S.C. 154(b) by 1259 days.

(21) Appl. No.: 17/462,664

(22) Filed: Aug. 31, 2021

(65) Prior Publication Data

US 2022/0079149 A1 Mar. 17, 2022

Related U.S. Application Data

(60) Provisional application No. 63/077,217, filed on Sep. 11, 2020.

(51) Int. Cl.
| | |
|---|---|
| *A01N 25/34* | (2006.01) |
| *A01N 25/04* | (2006.01) |
| *A01N 31/16* | (2006.01) |
| *A01N 33/12* | (2006.01) |
| *C08L 1/02* | (2006.01) |

(52) U.S. Cl.
CPC ............. *A01N 25/34* (2013.01); *A01N 25/04* (2013.01); *A01N 31/16* (2013.01); *A01N 33/12* (2013.01); *C08L 1/02* (2013.01)

(58) Field of Classification Search
None
See application file for complete search history.

(56) References Cited

U.S. PATENT DOCUMENTS

| | | |
|---|---|---|
| 2016/0279074 A1 | 9/2016 | Redmond et al. |
| 2020/0069545 A1 | 3/2020 | Cohen |
| 2020/0071659 A1 | 3/2020 | Skurnik et al. |

FOREIGN PATENT DOCUMENTS

| | | | | |
|---|---|---|---|---|
| CN | 104178846 A | * | 12/2014 | |
| CN | 111116943 A | * | 5/2020 | ............... C02F 1/285 |
| CN | 111393751 A | * | 7/2020 | ................ C08J 5/18 |
| JP | 2018184673 A | * | 11/2018 | |

OTHER PUBLICATIONS

Seung-Wuk Lee et al.( Virus-based fabrication of micro- and nanofibers using electrospinning Nano Letters (Mar. 2004), vol. 4, No. 3, pp. 387-390, 34 refs.) (Year: 2004).*

Taiqi et al.( Preparation of novel nano/submicrofiber catalyst containing nano-TiO2 particles, Journal of Applied Polymer Science (2012), 126(6), 1977-1) (Year: 2012).*

Microfibrillated Cellulose at a Glance: Characteristics and Potential Applications, Published online at least as early as Apr. 29, 2020, 32 pages, Borregaard of Sapsborg, Norway, www.exilva.com.

Sugar Beet Fibre: Physiological effects & Clinical studies, Published online at least as early as Jul. 2, 2020, 12 pages, Nordic Sugar AB, www.nordicsugar.com.

Cellulose Based Composites: New Green Nanomaterials, First Edition, Section 1, Edited by Juan P. Hinestroza and Anil N. Netravali, Published 2014 Wiley-VCH Verlag Gmbh & Co. KGaA, 26 pages.

Wen H, et al.; Isolation and Characterization of Cellulose Nanofibers from Banbusa rigida, 2013, pp. 5678-5689, 8 (4), BioResources, www.bioresources.com.

Claire Holland, et al., Nanofibers Produced from Agro-Industrial Plant Waste Using Entirely Enzymatic Pretreatments, 2018, pp. 443-453, 20, American Chemical Society, Biomacromolecules 2019, 20, 443-453, www.pubs.acs.org/biomac.

* cited by examiner

*Primary Examiner* — Alton N Pryor
(74) *Attorney, Agent, or Firm* — Streets Law Firm, P.C.; Jeffrey L. Streets

(57) ABSTRACT

A first decontaminating formulation includes a volatile solvent, a non-volatile encapsulating agent that is soluble in the volatile solvent, and a microfiber composition dispersed in the volatile solvent, wherein the microfiber composition forms a three-dimensional microfiber network within the volatile solvent. A second decontaminating formulation includes a volatile solvent and a non-volatile encapsulating agent that is soluble in the volatile solvent, wherein the non-volatile encapsulating agent has a melt point above 37 degrees Celsius. As the volatile solvent evaporates, the microfiber network collapses to trap a contaminant and/or the non-volatile encapsulating agent solidifies around the contaminant to immobilize and eliminate the contaminant.

20 Claims, 3 Drawing Sheets

FORMULATIONS FOR DECONTAMINATING A SURFACE

BACKGROUND

The present disclosure relates to formulations for decontaminating a surface, such as a hand sanitizer formulation for reducing or eliminating contaminants on a person's hands.

BACKGROUND OF THE RELATED ART

Hand sanitizers are widely used by people in homes, businesses, schools, churches, medical facilities, and other public places. A hand sanitizer is a liquid formulation intended to kill germs on a person's hands so that germs are not spread from the person's hands to other surfaces, such as food being prepared by the person or a surface that others may also contact. Furthermore, a hand sanitizer may be used to kill germs on the person's hands to avoid self-infection by spreading the germs into the person's own eyes, nose or mouth. Many occupations require the regular use of hand sanitizers in order to reduce or eliminate each of these manners of spreading germs.

The current COVID-19 virus pandemic highlights the risk of germs to individual health as well as the global economy. Viruses spread in different ways but are often transferred from various types of surfaces. Human movement is a particularly relevant element, where human hands are in frequent physical contact with a variety of surfaces, including the social greeting practice of handshaking. An important practice to deter a virus from spreading is to limit social physical contact or exposure and to refrain from touching even your own facial features since the eyes and nose are important entryways to the human body.

Another important practice to reduce the rate at which a virus may spread is the regular use of various chemicals to disinfectant a variety of surfaces, especially those that are frequently touched areas. The use of hand sanitizers is highly recommended, especially when soap and water are unavailable. Hand sanitizers are used to protect individuals from getting self-infected and to limit the spread of germs to other individuals and other surfaces. Traditional hand sanitizers are alcohol based. Ethyl alcohol and isopropanol are most frequently used in these type of product formulations, often at high concentrations above 60% or 70%.

There are several problems with current hand sanitizers. Even though alcohols are highly effective in general, there are some germs that are not killed by alcohols. Also, a certain amount of skill is needed to use hand sanitizers effectively. It is important that the hand surfaces are completely covered with the sanitizer and that the sanitizer has sufficient contact time, preferably up to 2 minutes to assure a sufficient killing efficiency of the viruses or germs. There is also a significant decrease in alcohol content during this time due to evaporation, which could impact the extent of the protection. Some hand sanitizers are formulated to reduce negative side effects, but frequent use of hand sanitizers may still have an adverse effect on sensitive skin. Some people also do not like the smell of alcohol-based products.

In addition to hand sanitizers and disinfectants, UV radiation may be employed for virus control in some settings such as hospitals and hotels. However, many materials and fabrics are degraded by UV exposure and a significant fraction of a contaminated surface area may be hidden from the UV source.

BRIEF SUMMARY

Some embodiments provide a decontaminating formulation comprising a volatile solvent, a non-volatile encapsulating agent that is soluble in the volatile solvent, and a microfiber composition dispersed in the volatile solvent, wherein the microfiber composition forms a three-dimensional microfiber network within the volatile solvent.

Some embodiments provide a decontaminating formulation comprising a volatile solvent and a non-volatile encapsulating agent that is soluble in the volatile solvent, wherein the non-volatile encapsulating agent has a melt point above 37 degrees Celsius, or above the human body temperature, to remain solidified on the skin surface.

DETAILED DESCRIPTION

Figure 1:
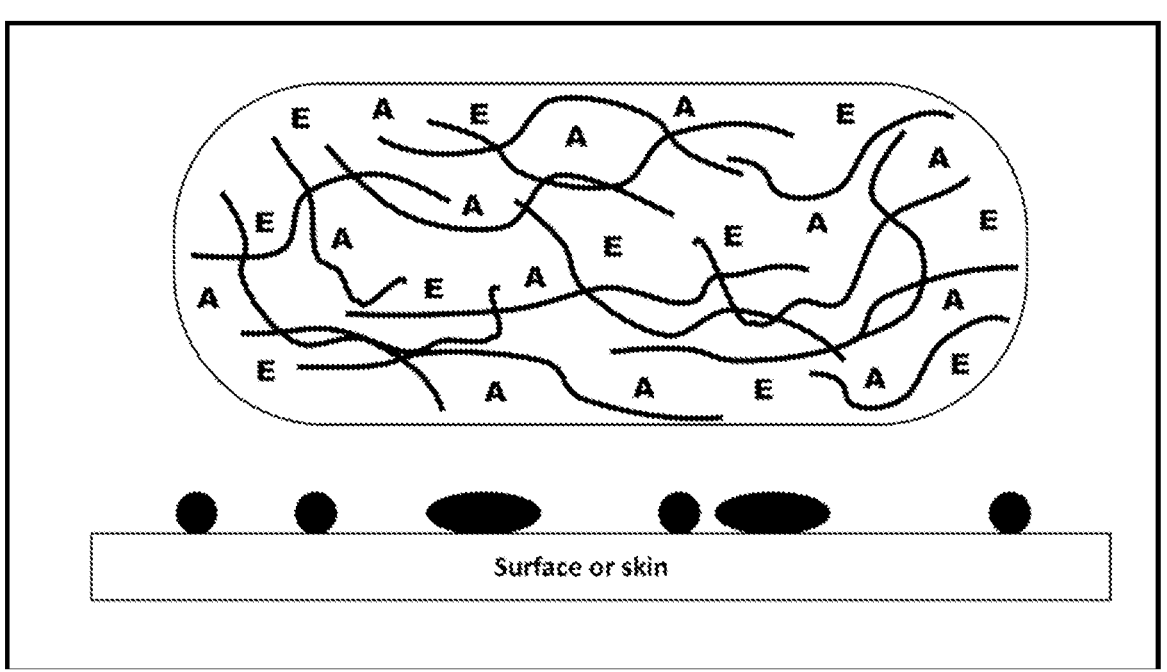
FIG. 1 is a conceptual diagram illustrating contaminants, such as germs and/or other hazardous materials, on a surface and a decontaminating formulation, such as a sanitizing formulation, to be applied to the surface.

Some embodiments provide a decontaminating formulation comprising a microfiber composition dispersed in a volatile solvent, wherein the microfiber composition forms a microfiber network within the volatile solvent. When an amount of the decontaminating formulation is applied to a surface and rubbed against the surface, any contaminants that were on the surface will become mixed into the decontaminating formulation. As the volatile solvent evaporates, the microfiber network collapses to trap the contaminants within the microfiber network. The trapped or immobilized contaminants may become ineffective or less hazardous within the collapsed microfiber network, or the collapsed microfiber network containing the trapped contaminants may be wiped or rinsed from the surface.

The Microfiber Composition

The term "microfiber" refers to fibers having a diameter of less than ten micrometers (μm). Any given material may be referred to as being "microfibrillar" if the material is in the form of a microfiber. Accordingly, terms such as "microfiber cellulose", "nanofiber cellulose", "nanofiber" and "microfibrillar cellulose" are synonymous. Furthermore, a "nanofiber" may have an even smaller diameter than a "microfiber", but a "nanofiber" is still considered to be a "microfiber" since it has a diameter less than ten micrometers (i.e., less than ten microns). A microfiber material may have a distribution of diameters and lengths, such that a microfiber material may include a minor fraction of the material outside a given dimensional range. In some examples, a microfiber material may be characterized as having greater than 50 weight percent of the material within a given diameter range, such as less than 10 micrometers, and/or greater than 50 weight percent of the material with a given length range, such as less than 100 microns long.

A microfiber composition may be made with many different materials, such as one or more natural polymers and/or one or more synthetic polymers. Non-limiting examples of suitable natural polymers, such as microfiber cellulose, may be mechanically and/or chemically derived from plants, such as wood (such as from hardwood and/or softwood trees), corn, starch, okra, wheat straw, soy hulls, rice husks, chicory root (a good source of inulin), bagasse, palm trees, ramie, bamboo, beets, sugar beets, potatoes, and/or carrots, without limitation. Other suitable natural microfiber polymers may be mechanically and/or chemically derived from algae and/or bacteria. Non-limiting examples of suitable synthetic polymers include polyester, polyamide, polypropylene and/or other synthetic polymers typically used in cloth and clothing, either used alone or in combination with microfibers derived from natural sources.

A "microfiber network" is a complex three-dimensional matrix of microfibers, such as entangled microfibers and/or interconnected microfibers. Any single microfiber may be linear or branched, wherein the degree of branching within the microfiber network may be a function of the source material used to form the microfibers and/or the chemical or mechanical processing of the source material.

In some embodiments, a microfiber network may include a first portion provided by a coarse microfiber material in combination with a second portion provided by a fine microfiber material. For example, the coarse microfiber material and the fine microfiber material may be obtained from different sources and/or prepared in a different manner or process. In one option, a coarse cellulose may be obtained or derived from a first source, such as wood, and a fine cellulose may be obtained or derived from a second source, such as a chicory plant. The coarse microfiber material may entangle or otherwise interact with the fine microfiber material to provide a microfiber network having desired properties. Both the coarse microfiber material and the fine microfiber material may have a distribution or range of diameters, lengths, aspect ratios and/or other dimensions, such that some fraction of the coarse and fine microfiber materials may have dimensions that overlap. However, the average or mean dimensions of the coarse material will have a distinguishable or measurable difference from the average or mean dimensions of the fine material. Furthermore, since the coarse and fine microfiber materials may be derived from different sources, the two materials may also differ in one or more other respect, such as chemical and physical surface properties, mechanical properties, extend of branching, and the like.

The concentration of microfiber material that is dispersed and/or suspended in the decontaminating formulation may be any amount that is suitable for preparing a decontaminating formulation. For example, the decontaminating formulation may include a microfiber composition having a concentration ranging from about 0.2 to about 10 percent by mass of the total decontaminating formulation, a concentration ranging from about 0.5 to about 5 percent by mass of the total decontaminating formulation, or a concentration ranging from about 0.2 to about 2 percent by mass of the total decontaminating formulation. The microfiber cellulose may begin to form a gel at a fully dispersed microfiber concentration of around 0.2 percent by mass in the decontaminating formulation. As the dispersed microfiber cellulose concentration increases above about 2 percent by mass, the formulation may begin to behave more like a cream than a gel, and may behave more like a hard paste near a dispersed concentration of about 10 percent by mass.

In some embodiments, the microfiber cellulose may not be fully dispersed into the liquid phase. For example, a first portion of the microfiber cellulose may be dispersed in the liquid phase and a second portion of the microfiber cellulose may be suspended in the liquid phase. Microfiber cellulose is produced as an entangled paste, such that a high-shear mixer (and time under shear) is needed to fully "detangle" and disperse the fibers in water or fluid (like water/alcohol mixtures). The more dispersed the fibers become, the stronger the gel will be at a specific concentration of microfiber cellulose. However, various embodiments may control the "degree of dispersion" to control of the "gel strength" independent of the "fiber loading." A greater amount of microfiber cellulose in the decontaminating formulation may provide a proportionally greater amount of "germ trapping potential." However, as the amount of dispersed microfiber cellulose increases, the gel could become so strong that it no longer has a pleasant feel when applied to the skin. While a pleasant feel may not be a critical parameter for many applications of a decontaminating formulation, a pleasant feel may be important for a hand sanitizing formulation. Embodiments may provide a "partial dispersion", such that the microfiber cellulose content may be increased to achieve greater "contaminant trapping potential" while controlling the fraction or percentage of the microfiber cellulose that will be dispersed and thereby achieve the gel behavior for best user experience in the application.

In some embodiments, a decontaminating formulation may include a total concentration (i.e., weight percent) of microfiber cellulose in the decontaminating formulation that is a sum of a first concentration of dispersed microfiber cellulose and a second concentration of suspended microfiber cellulose. For example, a decontaminating formulation may include greater than 5 percent by mass of microfiber cellulose, where only about 0.5 to 2 percent is dispersed and the remainder is suspended. For the purpose of a decontaminating formulation, it is the total amount of microfiber cellulose that determines the decontaminating capacity (i.e., contaminant trapping capacity, such as germ trapping capacity). Accordingly, the first concentration of dispersed microfiber cellulose may be optimized for human factors, such a comfortable feel and/or shear thinning behavior of a gel, and the second concentration of suspended microfiber cellulose may be optimized for decontaminating capacity or effectiveness. It is believed that the dispersed portion of the microfiber cellulose will participate in contaminant trapping, but embodiments may enable additional amounts of contaminant trapping to occur in a decontaminating formulation via the suspended portion of the microfiber cellulose.

In some embodiments, the decontaminating formulation further includes a microfiber composition suspended in the volatile solvent. In one example, the microfiber composition dispersed in the volatile solvent may have a concentration of about 0.02 to 3 weight percent of the decontaminating formulation, and the microfiber composition suspended in the volatile solvent may have a concentration of about 1 to 7 weight percent of the decontaminating formulation. In another example, the microfiber composition dispersed in the volatile solvent may be a microfiber obtained from a first source, and the microfiber composition suspended in the volatile solve may be a microfiber obtained from a second source. The first source of microfiber may be a microfiber cellulose (perhaps derived from wood) and the second source of microfiber may be inulin and/or starch (perhaps derived from chicory or a vegetable). The first source of microfiber may be dispersed in the volatile solvent to form a gel, whereas the second source of microfiber may be suspended in the volatile solvent to provide additional capacity for trapping contaminants, such as germs or non-living hazardous materials.

The microfiber compositions include microfibers that are in a suitable dimensional range and/or have sufficient surface area to physically trap and immobilize a variety of contaminants, such as germs. The microfiber compositions are dispersed and/or suspended within the solvent to form a microfiber network that acts as a "physical sponge" or "cage" to trap and immobilize contaminants. As the solvent evaporates, the microfiber network with the trapped contaminants may remain on the skin or other surface until it is wiped off or until the next time the hands or other surface are washed or wiped.

In some embodiments, the microfiber compositions include individual fibrils having a length in the micron range and a diameter in the sub-micron range. A "micron range" refers to a dimension greater than or equal to one micron, and a "sub-micron range" refers to a dimension less than one micron. A microfiber composition with fibrils of such dimensions are suitable for trapping a virus having a diameter within the range of 80 to 160 nanometers (nm), such as a member of the coronavirus family, and are specifically suitable for trapping a Covid-19 virus having a diameter of about 125 nm. Typical bacteria have dimensions in the range of 200 to 2,000 nm and become similarly trapped in the microfiber network. Cellulose microfibers having a surface area of 100-200 m$^2$/gram will form a microfiber network having a high probability of contacting and trapping a virus or other germ that becomes mixed into the decontaminating formulation, such as a sanitizing formulation. While diameter and/or length of microfiber cellulose may not be a direct indicator of good germ trapping capability, such dimensions may provide a rough indication of a size match between the microfiber network and the germ. Surface area per unit of weight of microfiber may be a somewhat better indicator of germ trapping capability or capacity than diameter and/or length, but other variables such as the extent of branching and microfiber size distribution may also be important. In some embodiments, the source of the microfiber itself may be an indicator of good germ trapping capability, since a given source of the microfiber and its chemical and/or physical treatment are expected to affect the length, diameter, surface area per unit of weight, branching and/or size distribution.

In some embodiments, the microfiber compositions provide a fiber network that can "cage" or "trap" a germ or other contaminant. For example, a microfiber composition may have a distribution of fiber dimensions and characteristics (lengths, diameters, extent of branching, and the like), where certain fibrils will provide a primary microfiber network and certain other fibrils will provide nanofibers that will attach to the microfibrils of the primary microfiber network or bridge between the microfibrils of the primary microfiber network to form a secondary microfiber/nanofiber network within the primary microfiber network. Branching and curvature will help to form an "enclosure" with some spacing in-between fibers. The spacing between fibers will preferably be large enough to allow a contaminant to pass into the microfiber network during initial contact between the decontaminating formulation and the contaminants, yet the spacing between the fibers will preferably narrow sufficiently upon solvent evaporation so that the same contaminants will become trapped in the collapsing or collapsed microfiber network. In some embodiments, the spacing between fibrils may be less than about 250 nanometer (twice the diameter of a typical virus), between about 100 nanometer (nm) and 1 micron, or between about 100 nm and 200 nm.

The microfiber composition has two main functions as a component of the decontaminating formulation. First, the physical network of microfibers forms a three-dimensional microfiber network that traps and immobilizes a germ as the alcohol evaporates causing the microfiber network to collapse. Second, the microfiber composition forms a physical network structure in the solvent and other liquids within the decontaminating formulation, wherein the physical network structure forms a gel. With the decontaminating formulation in the form of a gel, the decontaminating formulation is easy to handle and apply to the skin or other surfaces. Furthermore, the excellent shear thinning behavior of the microfiber allows the decontaminating formulation to spread easily and ensure good surface coverage of the skin or other surface.

In some embodiments, the microfiber composition is a microfiber cellulose. Microfiber cellulose may be derived from various plant-based sources, including wood, crops, vegetables and/or cellulose-containing waste products from various bio processes. Microfiber cellulose from a wood source is commercially produced by Borregaard as the EXILVA product line (EXILVA is a trademark of Borregaard located in Sarpsborg, Norway). Weidmann Fiber Technology, located in Rapperswil, Switzerland, is also producing their microfiber cellulose from wood sources, offering their product under the Celova trademark.

Microfiber cellulose may form a fibrous network that somewhat resembles a fishing net or cage. However, the fibrous network may include some large fibers with "branches" that are made up of smaller fibers. Some fibers may even have crevices, indentations, or other physical structures that may trap or assist in immobilization of a germ. While some of the fibers may have a size or branch structure that does not participate in germ immobilization, the microfiber composition will have some fraction or distribution of fibers that will participate in germ immobilization. In other words, the microfiber network may be heterogeneous.

The microfiber composition is dispersed and/or suspended into a liquid phase of the decontaminating formulation to form an expanded three-dimensional network. A microfiber cellulose composition, in particular, may be dispersed in a liquid phase to give the decontaminating formulation a gel-like consistency. A decontaminating formulation including microfiber cellulose may exhibit high (good) shear thinning, which means that the viscosity decreases under shear strain. So, a decontaminating formulation with a gel-like consistency may be applied to a surface and remain stationary, yet upon rubbing, agitation or other manner of applying shear strain, the decontaminating formulation will easily flow and spread over the surface. Furthermore, as the volatile solvent evaporates from the decontaminating formulation that has been rubbed onto the surface, the gel-like consistency or viscosity will increase even more so that the decontaminating formulation will remain stationary on the surface.

Cellulose microfibrils are built up of polysaccharide polymers. The cellulose polymer is a linear polymer that consists of D-glucose units linked together. In nature, these cellulose polymers stack together and form cellulose microfibrils. When the cellulose polymers are perfectly stacked together, it creates highly crystalline regions. However, disorder in the stacking will also occur leaving more amorphous regions in the microfibril. The crystalline regions in the microfibrils, and the very high aspect ratio, gives the material high strength. Microfiber derived from chicory root is commercially produced by Cargill as the Oliggo-Fiber product line (Oliggo-Fiber is a trademark of Cargill located in Minneapolis, Minnesota USA). Various grades of nanofiber and modified nanofiber products are commercially produced from sugar beet by Cosun Beet Company in Dinteloord, The Netherlands, under the trademarks of Betafib, Carboxyline, Quatin and BetaBind product lines.

Microfiber cellulose (MFC) has a much higher surface area than the cellulose raw material and therefore also a high number of accessible hydroxyl (OH) groups on the surface of the microfibrils. The exact surface area is hard to determine since many methods require drying of the material, but the fibrils aggregate strongly upon drying, which reduces the surface area. Using an azo dye (Congo red) method, the surface area of different microfiber cellulose has been estimated to be in the range of 100 to 200 square meters per gram ($m^2/g$). This method is performed in a wet state, and therefore, it is likely to give rather accurate results.

Various types of MFC have been developed. For example, MFC may be unmodified or may be chemically modified with regards to the hydroxyl groups on the surface of the microfibrils. Unmodified MFC is produced by using mechanical treatment, possibly combined with enzymatic pretreatment that leaves the hydroxyl groups on the microfibrils unchanged. The microfibrils in this type of MFC are often arranged in flexible aggregates and there are few individual microfibrils. In chemically modified MFC, the hydroxyl groups may be chemically replaced or substituted with, for example, carboxyl groups or carboxymethyl groups. The negative charge of the carboxyl groups and/or carboxymethyl groups on the surface of the microfibrils in an aqueous media causes a repulsion between the microfibrils and leads to easier separation. Often, this type of MFC has a high degree of individual microfibrils, and some of these types of MFCs are transparent materials since they may contain only fibrils that are smaller than the wavelength of visible light). The surface of the MFC can also be chemically modified with hydrophobic groups to increase the compatibility (i.e., water-insolubility) of the microfiber cellulose with hydrophobic systems. For example, the microfiber cellulose may be modified to include hydrophobic groups by reacting the hydroxyl groups with a fatty acid of low or high molecular mass to form an ester linkage between the pendant aliphatic (or aromatic) chain (or group) and the bulk fiber.

The properties of the MFC may also vary with the source of the cellulose (i.e., the raw material) that is used to produce the MFC. Different cellulosic raw materials may vary in their composition, purity, degree of polymerization of the cellulose polymers, fiber length, crystallinity, and other parameters. Each of these parameters may affect the properties of the MFC. In general, a high degree of control over the raw material may ensure a consistently high quality of the MFC.

Microfiber cellulose can be difficult to disperse in an aqueous (or other) liquid matrix. High shear rates (and long shear/mixing time) may be needed to fully "detangle" the fibers. For a decontaminating formulation, the microfiber cellulose may be "under dispersed" so that the decontaminating formulation may contain a greater amount of microfiber cellulose, yet have the same gel consistency, compared to a decontaminating formulation having a fully dispersed microfiber cellulose. The amount of contaminants that become trapped in a given volume of the decontaminating formulation may increase with an increasing amount of microfiber cellulose in the decontaminating formulation.

Modification of Microfiber Cellulose

In some embodiments, the physical properties of the microfiber cellulose may vary according to the source of the cellulose and the manner in which the source of cellulose is physically and/or chemically processed. Furthermore, the resulting microfiber cellulose may be further modified to impart one or more desired properties. For example, the microfiber cellulose may be modified by the addition of, or treatment with, surfactants, charged species, nanoparticles and/or polymers. A charged species secured to the microfiber cellulose may be used to attract contaminants, such as a virus, having a surface charge that is the opposite of the charge of the charged species that is secured to the microfiber cellulose.

In some embodiments of a decontaminating formulation, a microfiber cellulose may be used in combination with a particulate material. For example, a particulate material in the sub-micron size range may be used to significantly increase the effective surface area of the microfiber cellulose and may create pathways into the fiber network for movement of various contaminants, such as viruses or other germs, into the "core" of the fiber/particle network. Particulate materials may include finely grinded diatomaceous earth as an example or a whole range of other inorganic minerals or organic based materials, including nanoparticles of various kinds. The effectiveness or synergy between fiber and particle can be significantly enhanced by selecting the right particle with specific surface properties and particle size distribution as well as optimizing the fiber properties.

In some embodiments, microfiber cellulose may be modified with colloidal silver. The resulting microfiber cellulose may be used either to form a liquid gel formulation or a gel infused cloth. In either form, the silver-modified microfiber cellulose may be used as a sanitizer component of a decontaminating formulation for sanitizing hands or other surfaces. The colloidal silver, whether or not bonded to the microfiber cellulose, will not evaporate from the surface as does a volatile alcohol. Accordingly, the colloidal silver may have a lasting antimicrobial action within the microfiber network even after a germ has been trapped within the microfiber network. Microfiber cellulose may be similarly modified with other inorganic particulate materials, organic particulate materials, and/or charged particulate materials, which may perform in synergy with the microfibers.

In some embodiments, the cellulose fibers may be modified using one or more processes to make the cellulose fibers be more effective in the capture and retention of one or more targeted contaminant type. Depending upon the specific application of the formulation, the microfibers may be modified in different manners to achieve improved product performance for the specific application.

In some embodiments, the fiber may be modified to attach a water insoluble germicidal agent, such as a "biocide" or disinfectant. The water insoluble agent may be dispersed in water along with the microfiber cellulose to coat or otherwise attach the water insoluble agent to the fiber. The coated fiber may then "chemically kill" a germ that contacts the coated fiber, such as during collapse of the microfiber network as the volatile solvent evaporates. This embodiment enables a water insoluble germicidal agent to be incorporated into an aqueous gel formulation.

In some embodiments, the surface of the microfibrils may be modified by absorbing surfactants or polymers onto the microfibril surface. The absorbed substances may alter the properties of the microfiber cellulose, such as improving compatibility with hydrophobic systems, preventing loss of functionality upon drying of the material, and the like. The various modified microfiber cellulose compositions may then impart different functionalities to the decontaminating formulation. For example, the microfiber cellulose may have different properties as a result of the amount of hydroxyl groups available, compatibility with various systems, rheological properties, stability (temperature, pH and salt) and transparency.

The Volatile Solvent

In some embodiments, the volatile solvent includes a volatile alcohol and/or water. A volatile solvent will begin evaporating from the decontaminating formulation upon application to a surface. Non-limiting examples of a volatile alcohol include ethyl alcohol, isopropyl alcohol, n-propanol, isobutanol, n-butanol and combinations thereof. Some embodiments may provide an alcohol-free decontaminating formulation that only uses volatile solvents that are not alcohols, such as water. Some embodiments may provide a decontaminating formulation that includes a volatile alcohol as part of the volatile solvent. While a volatile alcohol may evaporate in a short period of time and enable the collapse of the microfiber network that physically traps contaminants, the volatile alcohol may also chemically attack contaminants, such as germs, during initial contact with a contaminated surface and until all of the volatile alcohol has evaporated. Accordingly, a decontaminating formulation that contains alcohol as a volatile solvent may be considered to be a "dual action" formulation, including both chemical attack and physical trapping. Optionally, the volatile alcohol may be provided at a concentration above 60%, such as between 60% and 95% or between 60% and 85%.

In some embodiments, the volatile solvent may be substantially free of any volatile alcohol. Such a volatile solvent may be water, but would be free from any ethyl alcohol, isopropyl alcohol, and/or n-propanol. Such embodiments may be beneficial as a hand sanitizer for people whose skin becomes dry or irritated by volatile alcohols.

In some embodiments, the volatile solvent may include a mixture of an alcohol and another volatile solvent, such as water. Accordingly, the alcohol concentration may be kept below about 50% for the purpose of raising the flashpoint and/or the autoignition temperature of the decontaminating formulation higher than for solutions with greater than about 60% alcohol as is found in many hand sanitizers.

Encapsulating Agent

In some embodiments, the decontaminating formulation may further comprise a non-volatile encapsulating agent. An "encapsulating agent" is a substance that can surround or coat another substance. In the context of the disclosed embodiments, an encapsulating agent may surround or coat a contaminant. The non-volatile encapsulating agent is preferably insoluble in water and a solid at the temperature at which the decontaminating formulation will be used. The non-volatile encapsulating agent may ensure contaminant immobilization by a viscosity increase brought about by solvent evaporation. For example, the non-volatile encapsulating agent may be an aliphatic alcohol, such as cetyl alcohol or other higher alcohols that are soluble in ethyl alcohol, but insoluble in water.

The encapsulating agent may be completely dissolved in the fluid/matrix of the decontaminating formulation and will only solidify upon solvent evaporation. Upon rubbing of contaminants into the decontaminating formulation, the contaminants will become completely wetted by the "solution" of the encapsulating agent and the solvent. Ideally, the individual microfibers are similarly wetted by the solution of the encapsulating agent and the solvent. As evaporation of the volatile solvent progresses, the concentration of the encapsulating agent will continue to increase on the surface of the virus (and fiber), and similarly the concentration of the encapsulating agent in any remaining solvent will also increase. Eventually the encapsulating agent will become a solid when sufficient solvent has evaporated. In the circumstance that the encapsulating agent solidifies around both a microfiber and a contaminant, the encapsulating agent may also be considered to be an entrainment agent. Some encapsulating agents may have varying levels of entrainment capabilities depending upon whether they have an affinity for both the contaminant and the fiber network. However, regardless of whether an encapsulating agent encapsulates a contaminant without involvement of the microfiber network or whether the encapsulating agent entrains the contaminant to be captured, immobilized (and possibly destroyed) on the microfiber network, the contaminant may be rendered harmless. Some embodiments provide a decontaminating formulation with synergistic interaction between a fiber network and an encapsulating agent to provide improved decontaminating performance regardless of the presence of an alcohol.

In some embodiments, an encapsulating agent for an alcohol-based decontaminating formulation, such as a sanitizing formulation, may be cetyl alcohol, since cetyl alcohol is non-volatile and soluble in most volatile alcohols. However, an encapsulating agent for an alcohol-free (volatile alcohol-free) decontaminating formulation may be polyvinyl pyrrolidone and/or polyvinyl alcohol, since these two agents are both non-volatile and soluble in water.

In some embodiments, the non-volatile encapsulating agent may be a polymer that is soluble in the volatile solvent and has adhesive properties and/or film-forming properties. Still further, the non-volatile encapsulating agent may include a natural oil, mineral oil, and/or synthetic oil. Nonlimiting examples of a natural oil include camphor oil, castor oil, olive oil, and/or alkoxylates of a natural oil, and non-limiting examples of a synthetic oil include a silicone-based oil.

The purpose of the encapsulating agent is to, partially or fully, cover the microbe or other contaminant to render it inactive, neutralized or immobilized. The encapsulating agent can play an additional enhanced role by encapsulating or entraining a microbe or other contaminant with a fiber element, in the same envelope, for additional immobilization. Once again, the formed envelope or encapsulation may fully or partially enclose or cover the microbes and/or fibers to create sufficient attachment between the microbes and fibers. Cetyl alcohol is a good example of a suitable encapsulating agent that can be used in an alcohol-based sanitizer formulation. Cetyl alcohol is soluble in the alcohols commonly found in hand sanitizers, like ethyl alcohol and isopropyl alcohol, but it is insoluble in water. After typical skin application, the volatile alcohol component will evaporate with time. The cetyl alcohol concentration will increase on the alcohol wetted fibers and microbes, until a critical concentration is reached where the cetyl alcohol will solidify around the fibers and microbes, to encapsulate both, leaving the microbes or contaminants isolated and immobilized. Any normally solid product or product mixture that is alcohol-soluble and water-insoluble can be used in this mechanism. It is also possible to apply the encapsulating mechanism in a water-based system that does not contain alcohol to provide an alcohol-free decontaminating formulation. Film-forming water-soluble polymers can be used as an encapsulating agent that serves to provide a primary microbe disabling mechanism in alcohol-free sanitization products. With water evaporation, the polymer concentration around microbes and fibers will increase and rise in viscosity to ultimately form a film or encapsulating envelope around the microbes and fibers to neutralize the microbe and immobilize the microbe in an attachment against the fiber structure. Polyvinyl pyrrolidone is a good example of a water-soluble polymer that can be used as an encapsulating agent in an alcohol-free sanitizer product. However, water soluble polymers may also be used in an alcohol-based sanitizer, either on its own or in a mixture with other polymers or normally solid materials like cetyl alcohol.

In some embodiments, the decontaminating formulation may include an encapsulating agent at a concentration ranging from about 0.1 to about 20 weight percent, or from about 0.2 to about 10 weight percent.

In some embodiments, the encapsulating agent has a melt point above about 37 degrees Celsius.

Non-limiting examples of encapsulating agents may include polyols, modified waxes, fatty acid derivatives, polyethylene oxides, polyoxyalkylates, ethers, polyethers, esters, polyesters, amides, polyamides and water-soluble polymers such as polyvinyl alcohol, polyacrylamides, cellulose derivatives like methylcellulose, hydroxypropyl methylcellulose, other cellulose ethers and salts thereof. Other examples of alcohols include lauryl alcohol, myristyl alcohol, arachidyl alcohol, caprylic alcohol, capric alcohol, linoleyl alcohol, linolenyl alcohol, behenyl alcohol, decanol, octanol, dodecadienol, decadienol, oleyl alcohol, eruca alcohol, ricinoleic alcohol, stearyl alcohol, isostearyl alcohol, fatty alcohols derived from natural fatty acids, fatty alcohols produced by reduction of naturally occurring triglycerides such as beef tallow or plant based such as palm oil, peanut oil, rapeseed oil, cottonseed oil, sunflower oil, soybean oil and linseed oil.

Non-Alcohol Chemical Sanitizers

In some embodiments, the decontaminating formulation may further comprise a non-alcohol sanitizing agent selected from benzalkonium chloride and/or triclosan.

Chemical Disinfectants

In some embodiments, the sanitizer formulation is a disinfectant formulation comprising a microfiber composition dispersed and/or suspended in a mixture of a volatile solvent and a disinfectant, wherein the microfiber composition forms a microfiber network within the volatile solvent. Nonlimiting examples of the disinfectant include a quaternary amine, bleach and/or colloidal silver.

Some embodiments of a disinfectant formulation may further include a particulate material. Nonlimiting examples of the particulate material include fine minerals, carbon, activated carbon, diatomaceous earth, graphene, amorphous silica, and/or charged particles. The inclusion of particulate materials in the decontaminating formulation provides additional surface area with contaminant trapping capability, either via an independent capability for contaminant trapping and/or a capability that arises due to the interaction of the particulate material with the fiber network. For example, the particulate material may become jammed in-between the fibers of the fiber network.

Optional Additional Components of the Formulations

In some embodiments, the decontaminating formulation, particularly a hand sanitizer formulation, may further include a humectant and/or an emollient. A humectant is a hygroscopic substance used to keep skin hydrated by drawing water into the stratum corneum (the outermost layer of the epidermis). One example of a humectant is glycerol. An emollient is a substance that prevents evaporation of water from the skin, such as by forming an occlusive coating on the surface of the stratum corneum.

Some embodiments of the decontaminating formulation may include a humectant and/or an emollient that may serve dual purposes. A first purpose of the humectant and/or emollient is to relieve the skin from the drying effect of any alcohol component that may be included in the decontaminating formulation. A second purpose of the humectant and/or emollient is to assist in the entrapment of contaminants and the immobilization of the contaminants by attachment to the physical microfiber network after the alcohol or other volatile solvent has evaporated.

Some embodiments of the decontaminating formulation may include an alcohol, reducer, oxidizer and/or quaternary ammonium salt. Examples of a reducer include L-lactic acid and/or citric acid. Examples of an oxidizer include peracetic acid and/or hydrogen peroxide. Examples of a quaternary ammonium salt include alkyldimethylbenzylammonium chloride and/or octyl decyl dimethylammonium chloride.

Some embodiments of the decontaminating formulation may include an antiseptic such as chlorhexidine and quaternary ammonium derivatives, a sporicide such as hydrogen peroxides that eliminate bacterial spores that may be present in ingredients, sterile or distilled water, foaming agent, colorants or fragrances.

Some embodiments of the decontaminating formulation may include small particles or nanoparticles in combination with the microfiber network. The inclusion of these particles provides additional surface area within the decontaminating formulation to increase the contaminant removal capacity of the decontaminating formulation. Non-limiting examples of the particles include fine minerals, carbon or activated carbon, diatomaceous earth, graphene, amorphous silica and/or charged particles. A high loading of small particles may act as a "scrub" or abrasive to assist in the release of contaminants from the surface and absorption of the contaminants into the particle-fiber network. The fiber network with its "solid like" behavior may ensure a stable dispersion of these particles in a decontaminating formulation and prevent the particles from settling.

Mechanism of Action

Embodiments of the decontaminating formulation immobilize contaminants for removal. Where the contaminant is a germ, the germ may be eliminated and/or killed by virtue of being immobilized, and immobilized germs are unable to target a potential host and are unable to spread. The germ and/or other contaminant that is immobilized in the microfiber network may be removed from a surface at a convenient time and in an appropriate way. Germs have limited lifetimes and may be killed or neutralized by immobilization over a period of time.

In some embodiments, the contaminant entrapment and immobilization mechanism of the decontaminating formulation may be able to sanitize a germ-contaminated surface regardless of whether or not the decontaminating formulation contains alcohol and/or any other chemical anti-microbial agent. An alcohol-free decontaminating formulation (or sanitizing formulation) may have advantages in both manufacturing and use. Where some germs might not be killed by the alcohol, all type of germs and other contaminants can potentially be eliminated by the universal physical trapping mechanism. Also, the effectiveness of killing germs with alcohol depends heavily on contact time. In contrast, the decontaminating formulation embodiments disclosed herein may be immediately effective against germs upon contact and immobilization.

Embodiments may rely exclusively on the immobilization (physical) mechanism or may employ the immobilization mechanism in combination with a chemical mechanism to provide a dual function. In the case of decontaminating formulations that employ the dual physical and chemical mechanism, contaminants such as germs that are not rendered ineffective (non-hazardous) by chemical action may be rendered ineffective (non-hazardous) by prolonged immobilization and/or removal from the surface.

The immobilization mechanism can be accomplished in different ways. For example, an encapsulating agent may work in combination with a physical microfiber network to entrain contaminants to the fiber network. For example, microfiber cellulose may provide a physical microfiber network having structure and dimensions that may trap various contaminants, including viruses and bacteria. The solid-like fiber infused fluid matrix will deform and flow with a temporary liquid-like consistency to cover the surface area when the decontaminating formulation is applied to skin or any other surface. When left undisturbed after application, the liquid-like fluid very quickly regains its original solid-like behavior to resist any movement in the matrix. A germ, for example, that becomes trapped in this frozen matrix for a prolonged period of time, will die without the ability to reach a host.

The ability of the physical fiber network, to "trap" and retain a contaminant can further be enhanced by the addition of an encapsulating agent and a volatile solvent, where the encapsulating agent will work in combination with the fiber network. A good example of an encapsulating agent is cetyl alcohol, which is soluble in the volatile solvents ethyl alcohol and/or isopropyl alcohol. Cetyl alcohol is sufficiently soluble in volatile lower alcohols, but becomes a solid with wax-like consistency at room or skin temperature upon evaporation of the lower alcohols. A highly efficient decontaminating formulation, such as a hand sanitizer formulation, can be made with a microfiber composition (such as microfiber cellulose) dispersed and/or suspended in a volatile alcohol (such as ethyl alcohol and/or isopropyl alcohol), in combination with an encapsulating agent (such as cetyl alcohol). Viruses and other contaminants will be surrounded upon application and agitation of the proposed decontaminating formulation on the contaminated surface. Upon evaporation of the volatile alcohol component, cetyl alcohol will start to form coatings around loose contaminants, while the viscosity of the original fluid matrix will rapidly increase. In this case, contaminants will be encapsulated by the non-volatile encapsulating agent which gradually solidifies in the residual matrix. Some of the contaminants may become trapped by a non-volatile encapsulating agent that forms clusters attached to the microfiber network. Both mechanisms lead to immobilization of the contaminant which can be removed as and when convenient.

Some embodiments provide a decontaminating formulation that is alcohol-free and thereby eliminates an undesired odor, damage to sensitive surfaces and/or flammability of the decontaminating formulation. For example, an alcohol-free decontaminating formulation, such as a hand sanitizer formulation, may rely upon the physical immobilization mechanism provided by the encapsulating agent and/or the microfiber composition. An encapsulating agent in the form of a water soluble polymer may be included in an aqueous dispersion of microfiber cellulose, where the water-soluble polymer functions as an adhesive that attaches germs or other contaminants to the fiber network on evaporation of the water (the volatile solvent). This embodiment allows an odorless, inflammable decontaminating formulation that can be used on sensitive skin or surfaces. Polyvinyl pyrrolidone is an example of such a water-soluble adhesive material that may serve as an encapsulating agent alone or in combination with a microfiber structure. Decontaminating formulations of this kind can be used on skin, material or fabric surfaces, to capture and immobilize contaminants for suitable disposal.

The residual collapsed fiber network can be washed off the surface with water and soap, or wiped off the surface with a cloth of some kind. It is important to note that a water and soap wash could release or free the immobilized contaminants from the fiber network and special awareness and care is necessary during such a process.

Some embodiments provide an alcohol-free decontaminating formulation that relies upon contaminant entrapment in the microfiber network as its primary mechanism of action to eliminate contaminants from a surface. For example, an alcohol-free decontaminating formulation, such as a hand sanitizer formulation, may be beneficial for use on sensitive skin, on sensitive surfaces, or in areas where flammable materials should not be used. Furthermore, an alcohol-free decontaminating formulation may have greater stability and shelf-life than a decontaminating formulation that relies upon alcohol as the primary mechanism of action to eliminate contaminants, such as germs, from a surface.

Some embodiments provide a decontaminating formulation that includes a chemical sanitizer component in addition to the microfiber network, which may be considered to be a physical sanitizer component. For example, the chemical sanitizer component may be an alcohol. Such a "dual action" sanitizer formulation may benefit from physical entrapment of contaminants in combination with chemical elimination of the entrapped or free germs. Furthermore, it should be recognized that a volatile alcohol serving as a volatile solvent in the decontaminating formulation may function as a chemical sanitizer component before it evaporates to facility facilitate solidification of the encapsulating agent and/or collapse of the microfiber network.

In the hypothetical case where a contaminant has equal affinity for a contaminated surface and a microfiber or particle surface within the decontaminating formulation, rubbing the decontaminating formulation over the contaminated surface may cause the contaminant to be transferred from the contaminated surface into the formulation. Providing a decontaminating formulation with microfibers and/or small particles will increase the amount of solid surface area in the formulation and increase the effectiveness with which a contaminant may be removed from the skin or other contaminated surface and "rolled up in the fluid" (where the contaminant will be trapped). Introducing particles or fibers that have an electrical charge into the decontaminating formulation can increase the affinity of some contaminants, such as viruses, for the surface of those particles or fibers. In both cases, the microfiber acts as a physical trap/substrate for association with the particles and the encapsulating agent can also attach the particle to the fiber as the volatile solvent evaporates. The contaminant may become trapped (various degrees of attachment) on the particle and the particle may become trapped on the fiber. Larger particles will be more prone to entanglement with the fiber network, thereby increasing the efficiency of contaminant trapping. Also, cellulose-based fibers have a lot of hydroxyl groups on the surface, which may provide a strong interaction through hydrogen bonding with either a virus, germ and/or other contaminant.

While alcohol-based decontaminating formulations may have the ability to kill many germs or neutralize other contaminants, various types of contaminants may be resistance to the chemical attack of most alcohols. For example, spores are extremely tenacious and prevalent, yet resistance to almost all treatments other than extended exposure to bleach or steam sterilization at high temperature and pressure in an autoclave. Skin and many other surfaces that come in contact with germs, such as spores, will not withstand exposure to bleach or sterilization conditions. However, the germ trapping mechanism of the decontaminating formulation embodiments may trap a spore in the same manner as any other germ or contaminant and may prevent the spore from developing into a new organism and/or having any other harmful effect.

Another embodiment provides a decontaminating formulation comprising a volatile solvent and a non-volatile encapsulating agent that is soluble in the volatile solvent. This embodiment may optionally contain no microfiber composition or perhaps a reduced amount of a microfiber composition. Accordingly, this embodiment may rely heavily or solely on the non-volatile encapsulating agent to capture contaminants. Any amount of a microfiber composition in the decontaminating formulation of this embodiment may be included primarily for the purpose of forming a gel and secondarily for adding contaminant trapping capacity. In one option, the volatile solvent may include (or may be) a volatile alcohol, and the non-volatile encapsulating agent may be soluble in the volatile alcohol. Accordingly, the non-volatile encapsulating agent may be cetyl alcohol and/or a non-volatile alcohol having 17 or more carbon atoms. In another option, the volatile solvent may include (or may be) water, and the non-volatile encapsulating agent may be soluble in water. Accordingly, the non-volatile encapsulating agent may be a water-soluble polymer selected from polyvinyl pyrrolidone, polyvinyl alcohol and combinations thereof.

Some embodiments provide a method of decontaminating a surface comprising applying a decontaminating formulation to a surface having a contaminant present on the surface, wherein the decontaminating formulation includes a volatile solvent and a microfiber composition dispersed in the volatile solvent, and wherein the microfiber composition forms a three-dimensional microfiber network within the volatile solvent. The method further comprises rubbing the applied decontaminating formulation over the surface having the contaminant with a microfiber cloth and allowing the decontaminating formulation to remain on the microfiber cloth until the volatile solvent has evaporated, wherein evaporation of the volatile solvent causes the microfiber network to collapse around fibers of the microfiber cloth and around the contaminant, wherein the contaminant becomes bound to the fibers of the microfiber cloth. Optionally, the microfiber cloth may be disposable. This method may be combined with any one or more features of the methods or decontaminating formulations disclosed herein.

Some embodiments provide a method of decontaminating a surface comprising applying a decontaminating formulation to a surface having a contaminant present on the surface, wherein the decontaminating formulation includes a volatile solvent and a non-volatile encapsulating agent that is soluble in the volatile solvent. The method may further comprise rubbing the applied decontaminating formulation over the surface having the contaminant with a microfiber cloth and allowing the decontaminating formulation to remain on the microfiber cloth until the volatile solvent has evaporated, wherein evaporation of the volatile solvent causes the encapsulating agent to form a film around fibers of the microfiber cloth and around the contaminant, wherein the contaminant becomes bound or attached to the fibers of the microfiber cloth. Optionally, the microfiber cloth may be disposable. This method may be combined with any one or more features of the methods or decontaminating formulations disclosed herein.

FIG. 1 is a conceptual diagram illustrating contaminants on a surface and a volume of a decontaminating formulation dispensed to be applied to the surface. The illustrated contaminants may include, for example, viruses, bacteria, asbestos, radioactive particles, spores, and/or other hazardous materials (represented by dark shapes) disposed on the surface. The surface may be any of a wide variety of surfaces, such as the surface of a person's skin or the surface of an inanimate object. For example, the inanimate object may be a floor, wall, countertop, doorknob, furniture, appliance, or other object upon which a contaminant may be present.

A dispensed volume of decontaminating formulation, which has not yet been applied to the surface, includes microfiber cellulose (MFC), an encapsulating agent (E), and a volatile alcohol (A) serving as a solvent. The encapsulating agent (E) may be dissolved in the alcohol (A), and the microfiber cellulose (represented by black lines) may be homogeneously dispersed and/or suspended in the mixture. At least a portion of the microfiber cellulose is preferably dispersed throughout the mixture to form a gel. While the encapsulating agent may be dissolved in the solvent to form a continuous liquid phase in the initial decontaminating formulation, the encapsulating agent is non-volatile and will become a solid when the volatile solvent evaporates upon use. Accordingly, the solid microfiber cellulose and the solidifying encapsulating agent remain on the surface where the decontaminating formulation was applied in order to perform contaminant trapping.

While FIGS. 1-5 illustrate the use of a decontaminating formulation that includes an encapsulating agent (E) and an alcohol (A), some embodiments do not require an encapsulating agent (E), some embodiments do not require a microfiber composition, and some embodiments may use a volatile solvent other than an alcohol. The discussion of FIGS. 1-5 should be read with the understanding that references to the alcohol may also describe some embodiments that use other volatile solvents, such as water, that references to the encapsulating agent describe an optional component of some embodiments of the decontaminating formulation, and that references to the microfiber composition describe an optional component of some embodiments of the decontaminating formulation. The present example illustrates and discusses how each of the components function in a combined decontaminating formulation, which is representative of how each component would function in other embodiments in which that component may be included.

Figure 2:
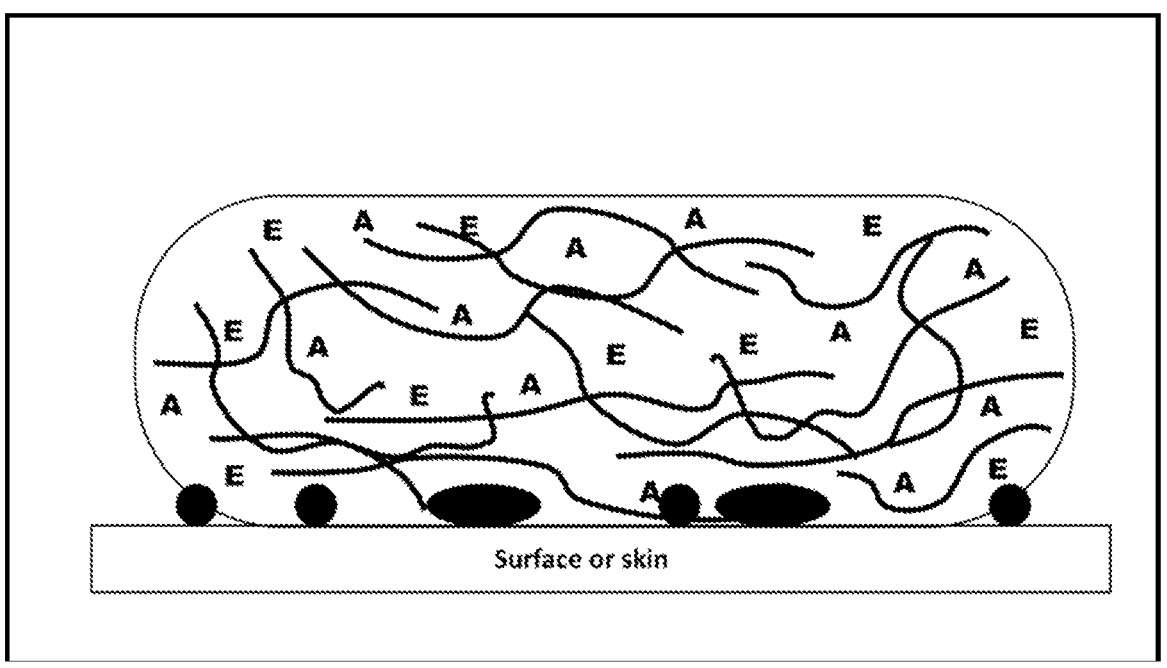
FIG. 2 is a conceptual diagram illustrating the decontaminating formulation that has been applied to the surface having contaminants thereon.

FIG. 2 is a conceptual diagram illustrating the dispensed volume of decontaminating formulation having been applied to the surface where the contaminants are present. Merely applying the decontaminating formulation to the surface may initiate contact between the decontaminating formulation and the contaminants, but the mere contact may be insufficient to accomplish decontamination. Still, applying the decontaminating formulation to the surface is a necessary step.

Figure 3:
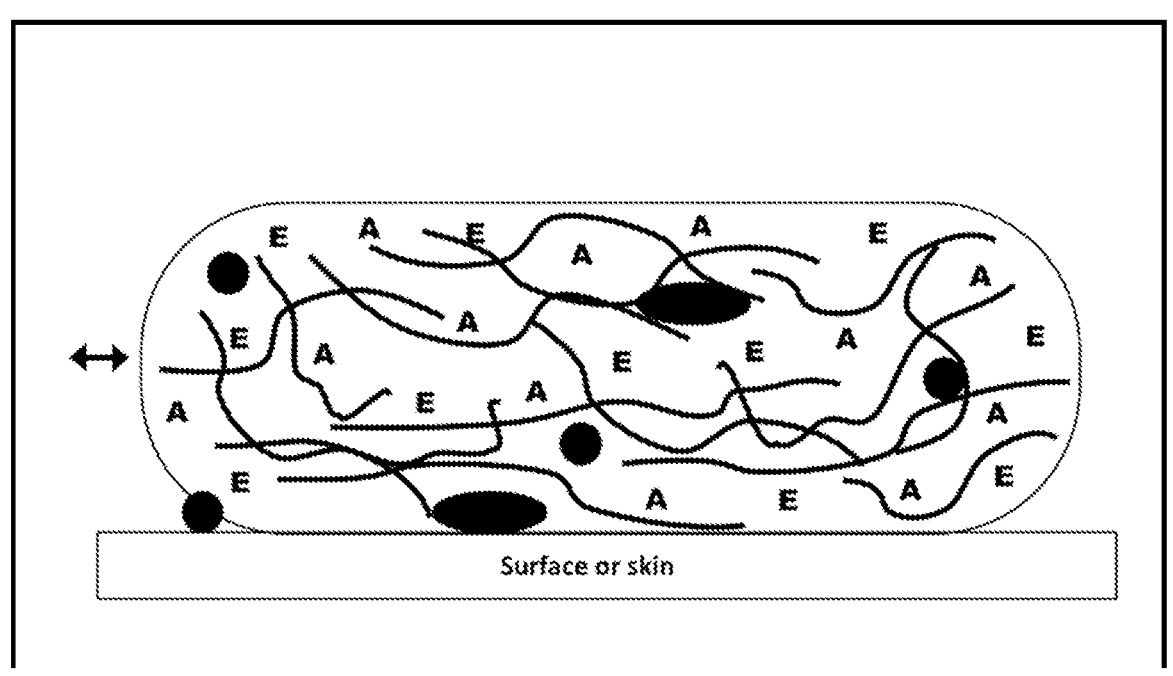
FIG. 3 is a conceptual diagram illustrating the contaminants mixed into the decontaminating formulation as a result of physical agitation of the decontaminating formulation relative to the surface.

FIG. 3 is a conceptual diagram illustrating the contaminants mixed into the dispensed volume of the decontaminating formulation as a result of physical agitation of the decontaminating formulation relative to the surface. For example, the decontaminating formulation may be rubbed over the surface or between two surfaces such that some of the contaminants are moved from the surface into the bulk of the decontaminating formulation, which may still be considered a homogeneous mixture. The agitation or rubbing may be performed with a hand, towel or other object applying a force that presses the decontaminating formulation against the surface in combination with a back-and-forth motion (see the arrows) to cause mixing of the contaminants with the components of the decontaminating formulation. With sufficient physical agitation, the contaminants will make contact with the various components of the decontaminating formulation.

Figure 4:
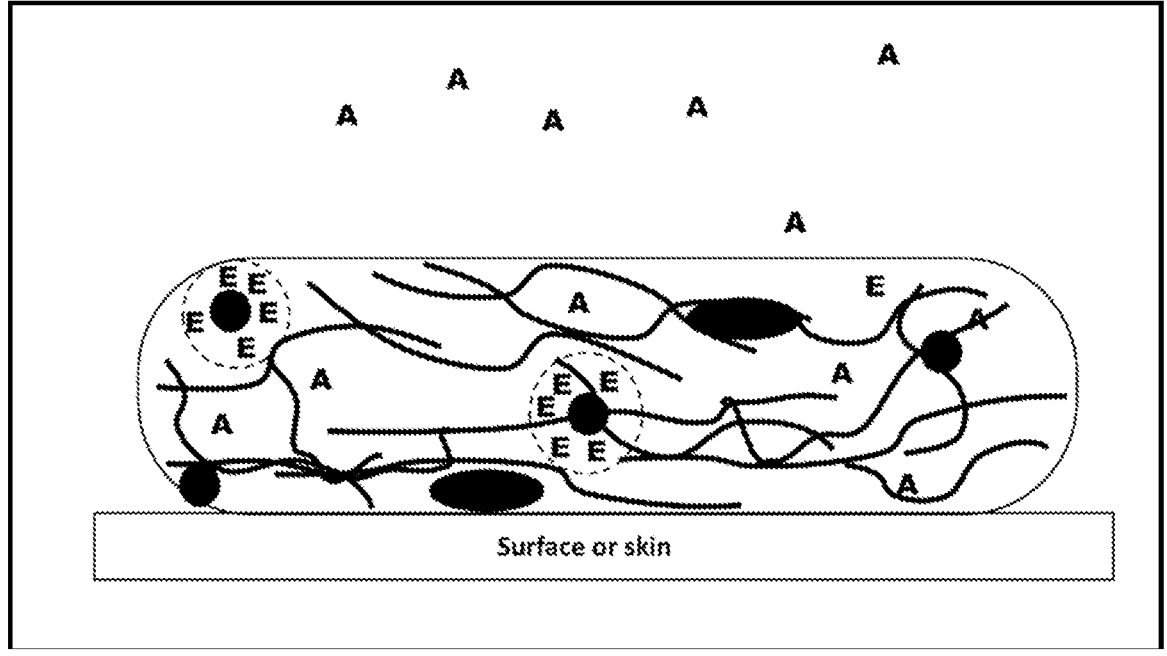
FIG. 4 is a conceptual diagram illustrating the evaporation of a volatile solvent, such as an alcohol (A), and contaminants becoming trapped in the microfiber network with or without the assistance of the non-volatile encapsulating agent (E).

FIG. 4 is a conceptual diagram illustrating the evaporation of a volatile solvent, such as an alcohol (A), from the dispensed volume of the decontaminating formulation and the contaminants becoming trapped in the microfiber network with or without the assistance of the non-volatile encapsulating agent (E) or becoming trapped in the non-volatile encapsulating agent (E) with or without the assistance of the microfiber network. Soon after the dispensed volume of the decontaminating formulation has been rubbed over the surface, the volatile alcohol component (A) starts to evaporate. The evaporation of the volatile alcohol component reduces the total remaining volume of the decontaminating formulation to less than the originally dispensed volume, thereby reducing the spacing between fibers within the fiber network, reducing the amount of alcohol within the decontaminating formulation, increasing the viscosity of the remaining volume of the decontaminating formulation, and increasing the concentration of the encapsulating agent around the viruses or contaminants.

One region of the mixture (towards the left in FIG. 4) illustrates a contaminant, such as a virus, that has become encapsulated by the non-volatile encapsulating agent during application, agitation and/or evaporation. This is an example of encapsulation, where no fibers are included in forming a cluster of the encapsulating agent to fully cover the contaminants with a wax like coating, which is held in position by the fluid matrix, now turning solid.

Another region of the mixture (towards the middle of FIG. 4) illustrates a contaminant, such as a bacteria, that has become encapsulated by the non-volatile encapsulating agent, where the contaminant bacteria and/or the encapsulating agent has been trapped or attracted to one or more microfiber of the microfiber network. In this case, the non-volatile encapsulating agent functions as an entrainment agent that attaches the contaminant to the fiber network. The same non-volatile encapsulating agent can then function as an encapsulating agent to surround a contaminant or, more specifically, as an entrainment agent to secure the contaminant to the fiber network. In a further option, the decontaminating formulation may include two or more non-volatile encapsulating agents, where a first encapsulating agent may provide entrainment involving the fibers and a second encapsulating agent may provide encapsulation without involvement of the fibers. Still further, the decontaminating formulation may include two or more non-volatile encapsulating agents, where a first encapsulating agent may provide greater entrainment involving the fibers than a second encapsulating agent, and where the second encapsulating agent may provide greater encapsulation without involvement of the fibers than the first encapsulating agent.

Figure 5:
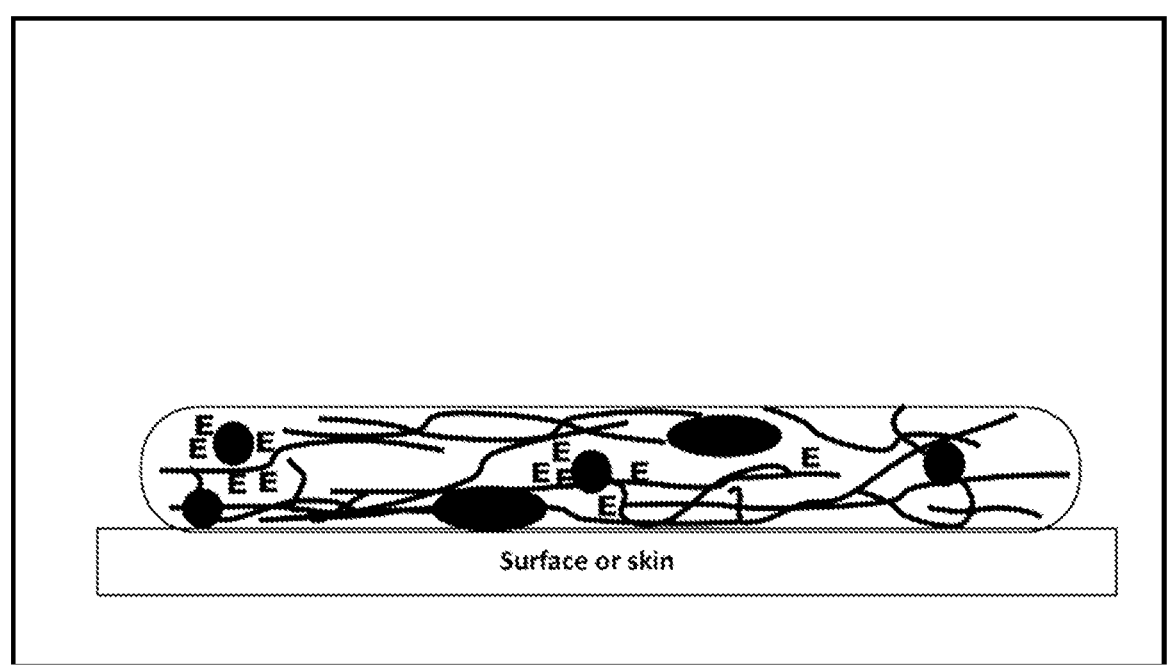
FIG. 5 is a conceptual diagram illustrating the nearly complete evaporation of the volatile solvent and the entrapment of the contaminants in the microfiber network with or without the assistance of the non-volatile encapsulating agent (E).

FIG. 5 is a conceptual diagram illustrating the nearly complete evaporation of the volatile solvent and the entrapment of the contaminants in the microfiber network with or without the assistance of the non-volatile encapsulating agent (E). The microfiber network has collapsed around the contaminants whether or not the contaminants have been encapsulated or entrained. Furthermore, some of the contaminants may be encapsulated by a non-volatile encapsulating agent whether or not the contaminants have been trapped by or attached to the microfiber network. Accordingly, the immobilized contaminants are no longer a threat. The residue of the microfiber network or solidified encapsulating agents may be subsequently removed from the surface by wiping with a cloth. Still, the trapped contaminants may also lose activity, or die in the case of a germ, as a result of being trapped, dehydrated and/or exposed to other components within the decontaminating formulation that do not evaporate at room temperature.

Applications for the Decontaminating Formulations

In some embodiments, the decontaminating formulation can be used as a hand sanitizer that can be frequently applied to the hands to ensure protection against germs or other contaminants where soap and water are not readily available. After drying, the hands can be wiped with a disposable cloth to remove the microfiber network. The trapped germs will be transferred to the cloth and allow frequent addition of fresh sanitizer to the hands as needed.

In some embodiments, the decontaminating formulation may be used on non-living surfaces, such as a contact surface of a kitchen table, wall in a hospital or business, floor, stair railing, car steering wheel, tool, equipment, and other objects. The decontaminating formulation may implement the same principle of contaminant entrapment, which may be followed by removal by wiping with a cloth. In some embodiments, the decontaminating formulation may be used for decontaminating a variety of hard and/or soft surfaces.

In some embodiments, the decontaminating formulation may be incorporated into a cloth to provide a germ trapping cloth. In one option, the germ trapping cloth may be a single-use, disposable cloth wipe. Alternatively, the decontaminating formulation may be used on conjunction with a cloth, such as a microfiber cloth, to perform the agitation and/or the wiping steps of a method of decontaminating a surface.

In some embodiments, the decontaminating formulation may be used as a body wash. A decontaminating body wash formulation may, for example, include particulate materials such as minerals and/or carbon to work in combination with the microfiber composition. Although using the decontaminating formulation as a shower gel, bodywash gel, shampoo, handwashing soap, carwash soap, and/or the similar applications may prevent the microfiber network from ever drying out and collapsing, the uncollapsed microfiber network may still assist with removal of contaminants such as bacteria, viruses, dirt, oils, etc., from the body.

Definition of Terms

The disclosed embodiments of a decontaminating formulation are not limited to any one or more types of microorganisms and/or chemical or biological agents that are to be reduced or eliminated. However, an understanding of the following terminology may provide a greater appreciation for the wide range of microorganisms and/or chemical or biological agents that may be reduced or eliminated using one or more embodiment of the decontaminating formulations.

Furthermore, the disclosed embodiments of a decontaminating formulation are not limited to any particular level of effectiveness against a particular type of microorganism or agent. However, an understanding of the following terminology may provide a greater appreciation for the wide range of effectiveness that the decontaminating formulations may provide.

A "microbe" or "microorganism" includes, without limitation, viruses, bacteria, archaea, fungi, and eukaryotes.

A "germ" or "pathogen" is an infectious or disease-causing agent or microbe, such as a virus, bacteria, archaea, fungi, and eukaryotes.

A "virus" is a submicroscopic infectious agent that replicates only inside the living cells of an organism. Scientific opinions differ on whether viruses are a form of life or organic structures that interact with living organisms. While viruses may possess genes, evolve by natural selection, and/or reproduce, viruses do not have a cellular structure or metabolism. The scope of the term "virus" as used herein is not limited by either of these opinions. Within the context of the present embodiments, a virus may be destroyed, removed or rendered harmless by a "viricide" or "antiviral agent" (or other compound that encompasses either of these terms) regardless of whether the virus is deemed to be a form of life or some other organic structure.

"Bacteria" are microscopic, single-celled organisms.

A "biocide" is a substance that destroys, deters, renders harmless, or exerts a controlling effect on any harmful organism. A biocide may be a pesticide or an antimicrobial.

An "antimicrobial" is an agent that kills microorganisms ("microbicidal") or inhibit their growth ("biostatic"). An antimicrobial agent may include a germicide, antibiotic, antibacterial, antiviral, antifungal, antiprotozoals, and anti-parasites.

An "antibiotic" is an antimicrobial substance that destroy microorganisms within the body.

An "antiseptic" is an antimicrobial substance that may be applied to a surface of living tissue, such as skin, to reduce the possibility of infection, sepsis or putrefaction. Some antiseptics are capable of destroying microbes ("microbicides" or "germicides"), while other antiseptics only prevent or inhibit the growth of microbes ("bacteriostatic")

A "disinfectant" is an antimicrobial substance that may destroy microorganisms found on non-living objects.

A "bactericide" is a substance that kills bacteria, whereas an "antibacterial" is a substance that is effective against bacteria.

A "viricide" is a microbicide that destroys virus particles, whereas an "antiviral agent" may inhibit replication or development of virus particles.

A "sterilizer" is a substance that removes, kills, or deactivates all forms of life. In reference to microbes, a sterilizer will remove, kill or deactivate fungi, bacteria, viruses, spores, unicellular eukaryotic organisms, and prions.

A "sanitizer" is a substance that reduces the amount of microbes on a surface.

A "hand sanitizer" is a formulation having an active ingredient that serves as a surface disinfectant. The most comment active ingredient in a hand sanitizer is an alcohol, such as isopropyl alcohol and/or ethanol.

A "contaminant" is any undesirable material that may pose a risk to a human or animal, such as a germ, radioactive particle, asbestos fibers hazardous dust, allergens and various other noxious or hazardous material. The contaminants that are subject to being trapped in the decontaminating formulations are typically solids, but may also be emulsified liquid droplets or gas in a foam.

"Decontaminating" refers to a formulation or method for reducing or eliminating the presence of a contaminant on a surface. "Sanitizing", "disinfecting", "sterilizing" and "cleaning" each refer to a specific type or extent of "decontaminating."

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A decontaminating formulation, comprising:
a volatile solvent;
a non-volatile encapsulating agent that is soluble in the volatile solvent; and
a microfiber composition dispersed in the volatile solvent, wherein the microfiber composition dispersed in the volatile solvent comprises microfiber cellulose, wherein the microfiber composition forms a three-dimensional microfiber network within the volatile solvent, and wherein the non-volatile encapsulating agent is a polymer that is soluble in the volatile solvent and has adhesive properties, and wherein the microfiber cellulose has a concentration from about 0.2 to 10 weight percent based on the total weight of the decontaminating formulation.

2. The decontaminating formulation of claim 1, wherein the microfiber cellulose concentration is from about 0.2 to 3 weight percent based on the total weight of the decontaminating formulation.

3. The decontaminating formulation of claim 1, wherein the microfiber composition comprises a first source of cellulose forming a coarse cellulose matrix and a second source of cellulose forming a fine cellulose matrix.

4. The decontaminating formulation of claim 3, wherein the first source of cellulose is derived from wood and the second source of cellulose is derived from one or more vegetable.

5. The decontaminating formulation of claim 1, wherein the volatile solvent comprises water.

6. The decontaminating formulation of claim 5, wherein the non-volatile encapsulating agent is a water-soluble polymer selected from polyvinyl pyrrolidone, polyvinyl alcohol and combinations thereof.

7. The decontaminating formulation of claim 1, wherein the non-volatile encapsulating agent is a natural oil selected from camphor oil, castor oil, olive oil, and/or alkoxylates of a natural oil.

8. The decontaminating formulation of claim 1, wherein the non-volatile encapsulating agent is selected from mineral oils and synthetic oils.

9. The decontaminating formulation of claim 1, wherein the decontaminating formulation is substantially free from any volatile alcohol.

10. The decontaminating formulation of claim 1, further comprising:

a microfiber composition suspended in the volatile solvent, wherein the microfiber composition suspended in the volatile solve has a concentration of about 1 to 7 weight percent based on the total weight of the decontaminating formulation.

11. The decontaminating formulation of claim 1, further comprising:

a microfiber composition suspended in the volatile solvent, wherein the microfiber composition suspended in the volatile solvent is inulin and/or starch.

12. A decontaminating formulation, comprising:

a volatile solvent comprising a volatile alcohol;

a non-volatile encapsulating agent that is soluble in the volatile solvent; and a microfiber composition dispersed in the volatile solvent, wherein the microfiber composition dispersed in the volatile solvent comprises microfiber cellulose, wherein the microfiber composition forms a three-dimensional microfiber network within the volatile solvent, and wherein the non-volatile encapsulating agent is cetyl alcohol, the non-volatile encapsulating agent is a non-volatile alcohol having 17 or more carbon atoms, or the non-volatile encapsulating agent is insoluble in water and solid at skin temperature, and wherein the microfiber cellulose has a concentration from about 0.2 to 10 weight percent based on the total weight of the decontaminating formulation.

13. A decontaminating formulation, comprising:

a volatile solvent;

a non-volatile encapsulating agent that is soluble in the volatile solvent;

a microfiber composition dispersed in the volatile solvent, wherein the microfiber composition dispersed in the volatile solvent comprises microfiber cellulose, and wherein the microfiber composition forms a three-dimensional microfiber network within the volatile solvent; and a non-alcohol sanitizing agent and/or a disinfectant, wherein the non-alcohol sanitizing agent is selected from benzalkonium chloride and/or triclosan, wherein the disinfectant is selected from a quaternary amine, bleach, colloidal silver and combinations thereof, and wherein the microfiber cellulose has a concentration from about 0.2 to 10 weight percent based on the total weight of the decontaminating formulation.

14. The decontaminating formulation of claim 13, further comprising:

a particulate material selected from fine minerals, carbon, activated carbon, diatomaceous earth, graphene, amorphous silica, charged particles and combinations thereof.

15. A decontaminating formulation, comprising:

a volatile solvent;

a non-volatile encapsulating agent that is soluble in the volatile solvent, wherein the non-volatile encapsulating agent is cetyl alcohol and/or a non-volatile alcohol having 17 or more carbon atoms; and a microfiber composition dispersed in the volatile solvent, wherein the microfiber composition dispersed in the volatile solvent comprises microfiber cellulose, wherein the microfiber composition forms a three-dimensional microfiber network within the volatile solvent, and wherein the microfiber cellulose has a concentration from about 0.2 to 10 weight percent based on the total weight of the decontaminating formulation.

16. A method of decontaminating a surface, comprising:

applying a decontaminating formulation to a surface having a contaminant present on the surface, wherein the decontaminating formulation comprises a volatile solvent and a microfiber composition dispersed in the volatile solvent, wherein the microfiber composition dispersed in the volatile solvent comprises microfiber cellulose, wherein the microfiber composition forms a three-dimensional microfiber network within the volatile solvent, and wherein the microfiber cellulose has a concentration from about 0.2 to 10 weight percent based on the total weight of the decontaminating formulation;

rubbing the applied decontaminating formulation over the surface having the contaminant with a microfiber cloth; and allowing the decontaminating formulation to remain on the microfiber cloth until the volatile solvent has evaporated, wherein evaporation of the volatile solvent causes the microfiber network to collapse around fibers of the microfiber cloth and around the contaminant, wherein the contaminant becomes bound to the fibers of the microfiber cloth.

17. The method of claim 16, wherein the decontaminating formulation further includes a non-volatile encapsulating agent that is soluble in the volatile solvent.

18. The method of claim 16, wherein the microfiber composition comprises a synthetic polymer selected from polyester, polyamide, and polypropylene, and combinations thereof.

19. The method of claim 16, wherein the volatile solvent includes a volatile alcohol.

20. The method of claim 16, wherein the microfiber composition comprises a first source of cellulose forming a coarse cellulose matrix and a second source of cellulose forming a fine cellulose matrix.

* * * * *